(12) United States Patent  
Christopulos et al.

(10) Patent No.: US 8,774,465 B2  
(45) Date of Patent: Jul. 8, 2014

(54) SYSTEM AND METHOD FOR PROVIDING AUTOMOTIVE PURCHASE, INSURANCE QUOTE, AND VEHICLE FINANCING INFORMATION USING VEHICLE RECOGNITION

(75) Inventors: Nick U. Christopulos, Bloomington, IL (US); Matthew R. Anderson, Bloomington, IL (US); Nathan Lee Tofte, Downs, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/494,573

(22) Filed: Jun. 12, 2012

(65) Prior Publication Data

US 2013/0329943 A1    Dec. 12, 2013

(51) Int. Cl.
*G06K 9/00* (2006.01)
*G06Q 30/00* (2012.01)

(52) U.S. Cl.
USPC .......................................... 382/104; 705/26.3

(58) Field of Classification Search
USPC .......................................... 382/104; 705/26.3
See application file for complete search history.

(56) References Cited

U.S. PATENT DOCUMENTS

| | | | |
|---|---|---|---|
| 7,640,169 B2 * | 12/2009 | Horton | 705/1.1 |
| 8,345,921 B1 * | 1/2013 | Frome et al. | 382/103 |
| 2003/0233275 A1 * | 12/2003 | Melvin | 705/14 |
| 2006/0085208 A1 * | 4/2006 | Nelson et al. | 705/1 |
| 2007/0009136 A1 * | 1/2007 | Pawlenko et al. | 382/104 |
| 2010/0150458 A1 * | 6/2010 | Angell et al. | 382/224 |
| 2011/0131605 A1 * | 6/2011 | Pratt et al. | 725/39 |
| 2011/0264552 A1 * | 10/2011 | Seergy et al. | 705/26.3 |
| 2011/0280447 A1 * | 11/2011 | Conwell | 382/103 |
| 2012/0036033 A1 * | 2/2012 | Seergy et al. | 705/26.3 |
| 2012/0106802 A1 * | 5/2012 | Hsieh et al. | 382/105 |
| 2012/0109770 A1 * | 5/2012 | Seergy et al. | 705/26.2 |
| 2012/0230548 A1 * | 9/2012 | Calman et al. | 382/104 |

FOREIGN PATENT DOCUMENTS

JP    10143724 A * 5/1998   ............... G07F 7/08

* cited by examiner

*Primary Examiner* — Wenpeng Chen  
(74) *Attorney, Agent, or Firm* — King & Spalding L.L.P.

(57) ABSTRACT

A system for providing vehicle information at an automobile point of purchase includes a user device having a camera or other image capturing device that is used to capture an image of an automobile. An application on or associated with the image capturing device can either transmit the image to a service provider for processing, or can implement one or more steps in a feature recognition process locally, and thereafter transmit the data to a service provider. In either case, the service provider can then complete the feature recognition processing and identify the automobile from the image. The service provider can then communicate with a make and model database to provide useful information on the vehicle, which can then be transmitted to the user device and conveniently displayed.

29 Claims, 12 Drawing Sheets autobuyer ASSISTANT

[🏠 Home > Car Info > Comparison

Now Viewing: Toyota RAV4

Comparing with: 2008 Toyota Camry (Too much? Customize your comparison here.)

| 802 | 2008 Toyota Camry | 2008 Toyota RAV4 |
|---|---|---|
| MSRP | $18,720 | $21,250 |
| Invoice Price | $15,324 | $18,500 |
| Horsepower | 126 | 140 |
| Transmission Type | 5M | 5M |
| MPG (City/Hwy) | 22/25 | 19/21 |
| Safety: Front Pass. | 5 Stars | 5 Stars |
| Safety: Front Driv. | 5 Stars | 5 Stars |

E-mail this page | Speak with an agent

*FIG. 8*

SYSTEM AND METHOD FOR PROVIDING AUTOMOTIVE PURCHASE, INSURANCE QUOTE, AND VEHICLE FINANCING INFORMATION USING VEHICLE RECOGNITION

BACKGROUND OF THE INVENTION

1. Field of the Invention

This invention relates to a system and method for improved automotive purchase information, insurance quote, and vehicle financing provisioning using vehicle recognition.

2. Description of the Related Art

The process of buying a new or used automobile or other vehicle is a difficult one for many people. Many consumers wishing to purchase, say, an automobile will conduct preliminary research on the Internet (or via other sources) including make and model, insurance costs, price, and loan options before visiting a dealer lot to conduct a test drive or make a purchase.

Alternatively once on a dealer lot, consumers can manually enter vehicle identification (e.g., automobile make, model, year) information into software applications, e.g., Web pages or smartphone apps, and receive various insurance or financing or other information related to the vehicle. However, manually entering or selecting vehicle information for use by the application can be a relatively time-consuming process, such that many people will give up prior to receiving the objective information, especially when salespeople are hovering nearby.

Furthermore, consumers are often overwhelmed with difficult decisions in the areas of vehicle features, financing, insurance, and other options, especially while on the dealer lot. A dealer's persuasive sales tactics, combined with the absence of an unbiased information source on the car lot, can make the buying process unpleasant.

SUMMARY OF THE INVENTION

These and other drawbacks in the prior art are overcome in large part by a system and method according to embodiments of the present invention.

A system for providing vehicle information includes a user device having a camera or other image capturing device that is used to capture an image of an automobile. An application on or associated with the image capturing device can either transmit the image to a service provider for processing, or can implement one or more steps in a feature recognition process locally. In either case, the device or the service provider can then complete the feature recognition processing and identify the automobile from the image. The user device or the service provider can then communicate with a make and model database to provide useful information on the vehicle, which can then be transmitted to the user device and conveniently displayed. In some embodiments, an image of a rear portion of the vehicle is captured. In some embodiments, the license plate area can be detected and used to crop the vehicle present in the image for more accurate processing.

According to some embodiments, a system for providing information to a purchaser of a vehicle or party interested in financing or insurance options for a vehicle includes an image capturing device; at least one processing device in communication with the image capturing device configured to receive an image of at least a portion of a vehicle from the image capturing device, the at least one processing device further configured to identify a vehicle from the image received from the image capturing device; and at least one database in communication with the at least one processing device, wherein the processing device is configured to access information from the database corresponding to a vehicle identified from the image.

In some embodiments, the at least one processing device is configured to identify the vehicle using a scale invariant feature transforms (SIFT) based method. In some embodiments, the at least one processing device is configured to identify the vehicle using a speeded-up robust features (SURF) based method.

According to some embodiments, a method for use in a network includes, at least one computing device, receiving an image of at least a portion of a vehicle; and delivering vehicle-related information responsive to identifying the vehicle from the image. In some embodiments, the vehicle-related information comprises vehicle-specific information. In some embodiments, the vehicle-related information comprises insurance information. In some embodiments, the vehicle-related information comprises financing information. In some embodiments, the vehicle-related information comprises comparative information associated with a purchase of the vehicle. In some embodiments, the vehicle-related information comprises historical information about the vehicle. The vehicle may be identified using global based, local feature based or other object recognition approaches.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 8 illustrates exemplary side-by-side compare of a pair of vehicles.

DETAILED DESCRIPTION OF EMBODIMENTS OF THE INVENTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As discussed above, a system and method for providing vehicle information automatically identifies a vehicle by way of an image captured by a user.

Figure 1:
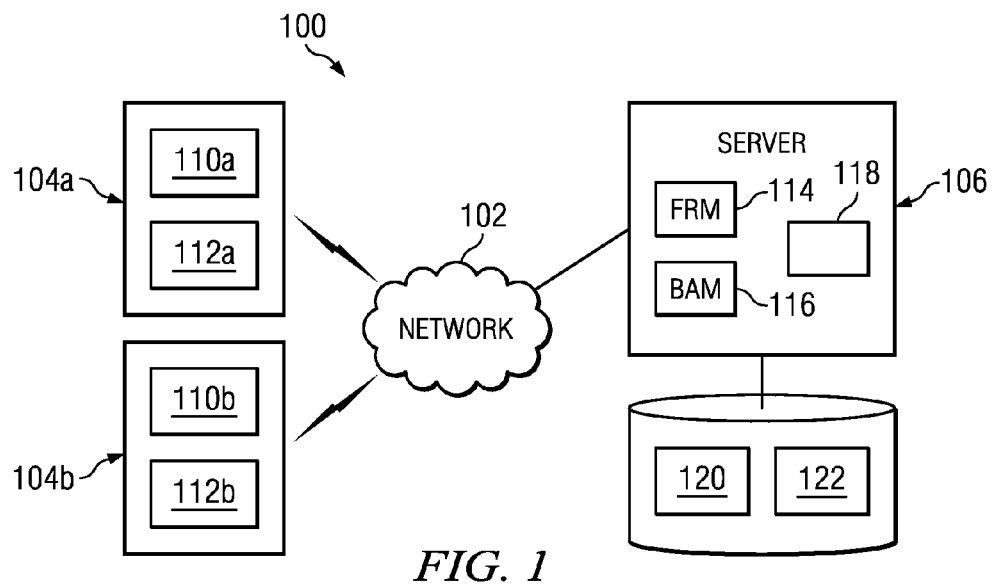
FIG. 1 is a high level block diagram illustrating a system for point of purchase image capture and vehicle information provisioning.

Turning now to the drawings and, with particular attention to FIG. 1, a diagram of a system 100 is shown. System 100 includes one or more networks 102 which may include one or more of the Internet, a cellular network, wired or wireless, local or wide area networks, etc.

One or more user devices 104a, 104b may be communicatively coupled to the networks 102. The one or more user devices 104a, 104b may be implemented as any suitable processing device, such as a laptop computer, tablet computer, cellular telephone, and the like. In accordance with embodiments of the invention, the user devices 104a, 104b may include image capturing devices 110a, 110b, which may be implemented as cameras, as well as one or more vehicle assistant applications 112a, 112b. As will be explained in greater detail below, the one or more vehicle assistant applications 112 may be configured to cause the image capture devices 110 to capture an image, receive images from the image capture devices 110, provide some or no image processing, and transmit data related to the images over the network 102.

Also in communication with the network 102 may be one or more servers 106 operated by one or more service providers. The server 106 may implement a feature recognition module 114 and a buyer assistant module 116. The server 106 may be in communication with one or more databases 108, which may store one or more vehicle image repositories 120 and one or more make and model databases 122. Further, in some embodiments, the server 106 may implement one or more web pages 118 allowing the user devices 104 to access various information, as will be described in greater detail below.

The image capturing device 110 may be any suitable digital camera, for example, one associated with or built into a cellular telephone. The vehicle assistant application 112 may be software or other application and in some embodiments may be implemented as an app, such as available from the Android app store or the Apple iPhone app store. In operation, as will be explained in greater detail below, in some embodiments, the vehicle assistant app 112 allows a user to capture an image using the image capture device 110, receives an image of a vehicle, and transmits it or information derived therefrom to the server for processing, either by the feature recognition module 114 or the buyer assistant module 116. In addition, the vehicle assistant app 112 may interface to the web page 118 to provide insurance and/or financing and other information to a user upon identification of the particular vehicle.

In some embodiments, the feature recognition module 114 receives the image, extracts features, and compares them with data from the image database 120 to identify the vehicle. An identification of the vehicle may then be passed to the buyer assistant module 116, which may then access corresponding data from the make and model databases 122.

In other embodiments, the feature recognition module 114 receives already-extracted data from the vehicle assistant application 112 and compares the extracted data to the image data from the image database 120 to identify the vehicle. In still other embodiments, the vehicle assistant app 112 extracts image data from the captured image and accesses an on-board image database (or communicates with the server 106 to access the image database 120) and performs the vehicle identification itself. In such cases, the vehicle assistant app 112 can then communicate with the server 106 to access the make and model database 122.

In some embodiments, the image captured is an image of a Vehicle Identification Number (VIN) through the front windshield, from the driver's side door, window sticker, or other locations. In such embodiments, the vehicle assistant app 112 (or the server 106) may include an optical character recognition (OCR) module or barcode reader used to recognize the VIN. From the VIN, the vehicle may be identified and the make and model database 122 and other databases can be accessed to provide information related to the make and model or even specific to that particular vehicle.

In some embodiments, say, when the identification is of a new car, make and model data may include financing options, fuel economy, costs of operation per mile, insurance information, etc. In embodiments in which the vehicle is a used car, the make and model information may further include data specific to that vehicle, such as whether it has been in any accidents, repair history, etc. In either case, the data may then be provided to the user via the vehicle assistant app 112 for display to the user. Further, it is noted that while service provider databases are shown, in some embodiments, the vehicle assistant app 112 or the buyer assistant module 116 can access third-party provided databases. For example, in some embodiments, a third-party provided license plate or VIN database may be accessed, so as to identify particular automobiles and their users.

In general, the task of recognizing the make, model and year of a vehicle from an image is an example of object recognition in the field of computer vision. Any suitable method of make and model recognition may be used. In particular, feature recognition in accordance with embodiments of the invention may use global appearance based approaches or local appearance based approaches. A global appearance based approach models an entire image, and is concerned with using template images with varying lighting conditions, viewing directions, sizes, and shapes. Various image processing techniques, such as edge matching, grayscale matching, and gradient matching help determine the object in question by matching it to the template image.

The local feature based approach identifies interesting points in the image which provide a feature description of the object. The features that are extracted attempt to be invariant to scale, noise, illumination, and pose. These points are typically found in areas of high contrast, such as corners and edges. Feature points of the object are then matched to feature points in the new image using various search algorithms. Two local feature based methods that may be suitable for use with embodiments as described are Scale Invariant Feature Transform (SIFT) and Speeded Up Robust Features (SURF).

As will be explained in greater detail below, some embodiments detect a region of interest around a vehicle's license plate. According to one embodiment, the SURF algorithm may be used to compare other license plates to an image of the vehicle. When there are numerous matches in a small area of the image it is likely that the license plate is in that region. That is, SURF may be used to compare sample license plates against each vehicle image and cluster the matching points to determine a likely rectangular region of the license plate.

Another embodiment uses edge detection techniques to detect the license plate region. That is, edge detection is performed on the image of the vehicle and histograms of edges are produced. Peaks in the histogram are likely caused by an abundance of edges that are found in license plates due to the letters and other details, and are compared to other areas of the image. Other methods may be used to detect the license plate area.

After identifying the license plate region, the desired vehicle region can be processed to identify the vehicle. In some embodiments, in either case, the resulting identified "cropped" region of interest is analyzed using the SURF algorithm to identify the vehicle.

It is noted that in other embodiments, it may not be necessary to detect the license plate region prior to using the SURF algorithm if the region of interest could otherwise be detected using object detection methods and/or machine learning techniques. Other embodiments could simply instruct the user to position a particular region of the vehicle in the image prior to taking the picture. In addition, it is noted that while identification of the vehicle from a region of interest at the rear of the vehicle is discussed herein, other angles and views of the vehicle may be used for vehicle identification.

Figure 2A:
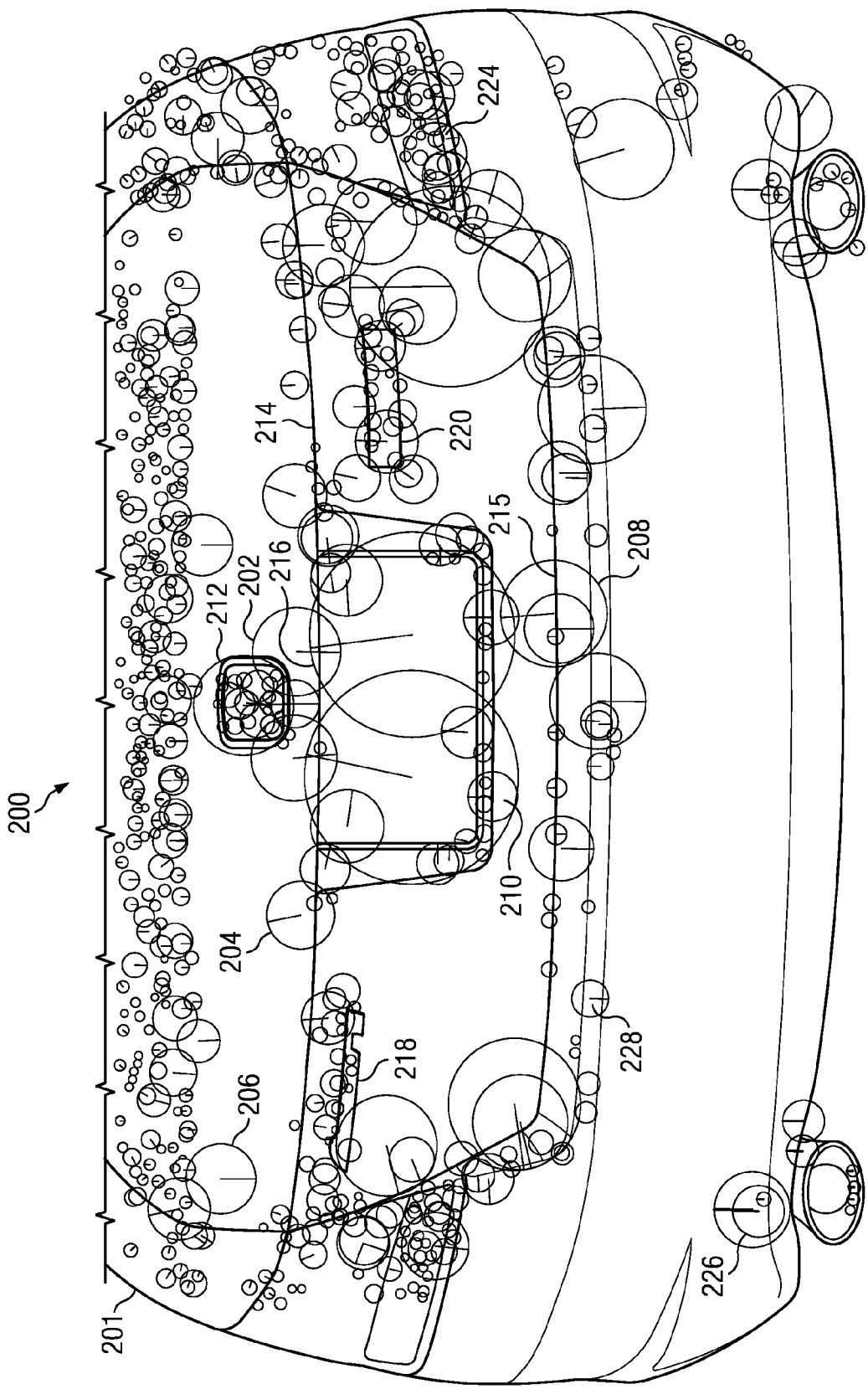
FIG. 2A illustrates exemplary interest points selected on a cropped image of the rear of an automobile.

Shown in FIG. 2A is a photo 200 of a rear end of an automobile, cropped around a license plate area. Feature extraction points 202, 204, 206, 208, 210, etc., are extracted to form a baseline and are stored in the image database 120. When a potential purchaser takes a photo of an automobile, points are likewise extracted and are compared to those in the database 120.

More particularly, according to exemplary methods, once a photo is taken of a vehicle, "interest points" are extracted. These are distinctive points, such as corners, "blobs," and T-junctions. Thus, as can be seen, significant numbers of interest points are chosen at the vehicle's rear window edge 201, the make insignia 212, the trunk/hatch edges 214, 215, license plate 216, model identifier 218, dealer sticker 220, brake and reverse lights 224, rear bumper 226, 228, and the like.

Once the interest points have been identified, a feature vector may be defined in the area of each of the interest feature points. Depending on the nature of the interest point, the vector may be of greater or less magnitude, and is shown in the figure as a radius of a circle around the interest point.

These descriptor vectors can then be matched against corresponding feature vectors of the baseline image(s) stored in the image database 120. The matching is based on a "distance" between the vectors, such as a Euclidean distance between the vectors.

Figure 2B:
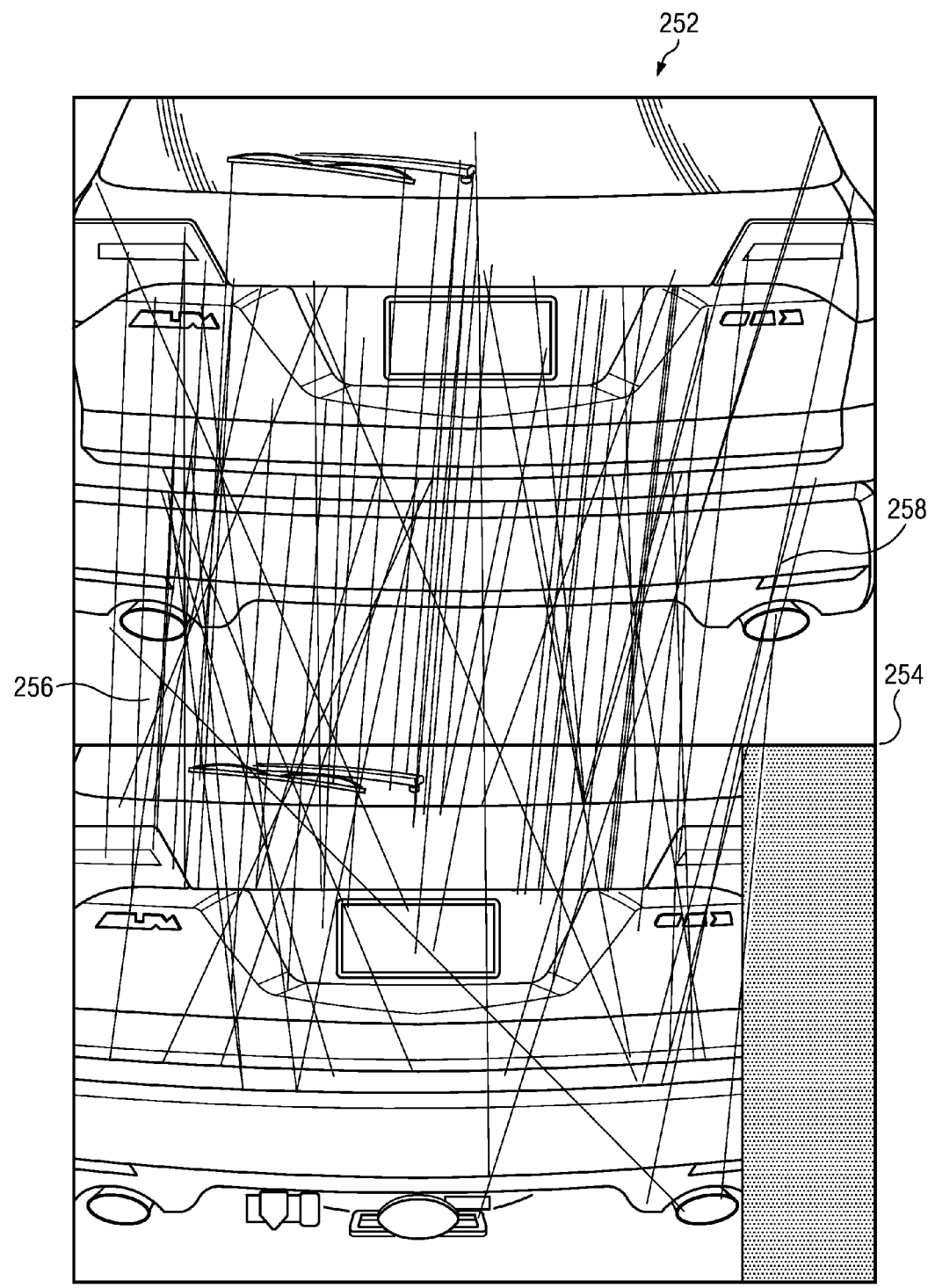
FIG. 2B illustrates exemplary feature vector matching for a captured image and an image in an image library.
Figure 2C:
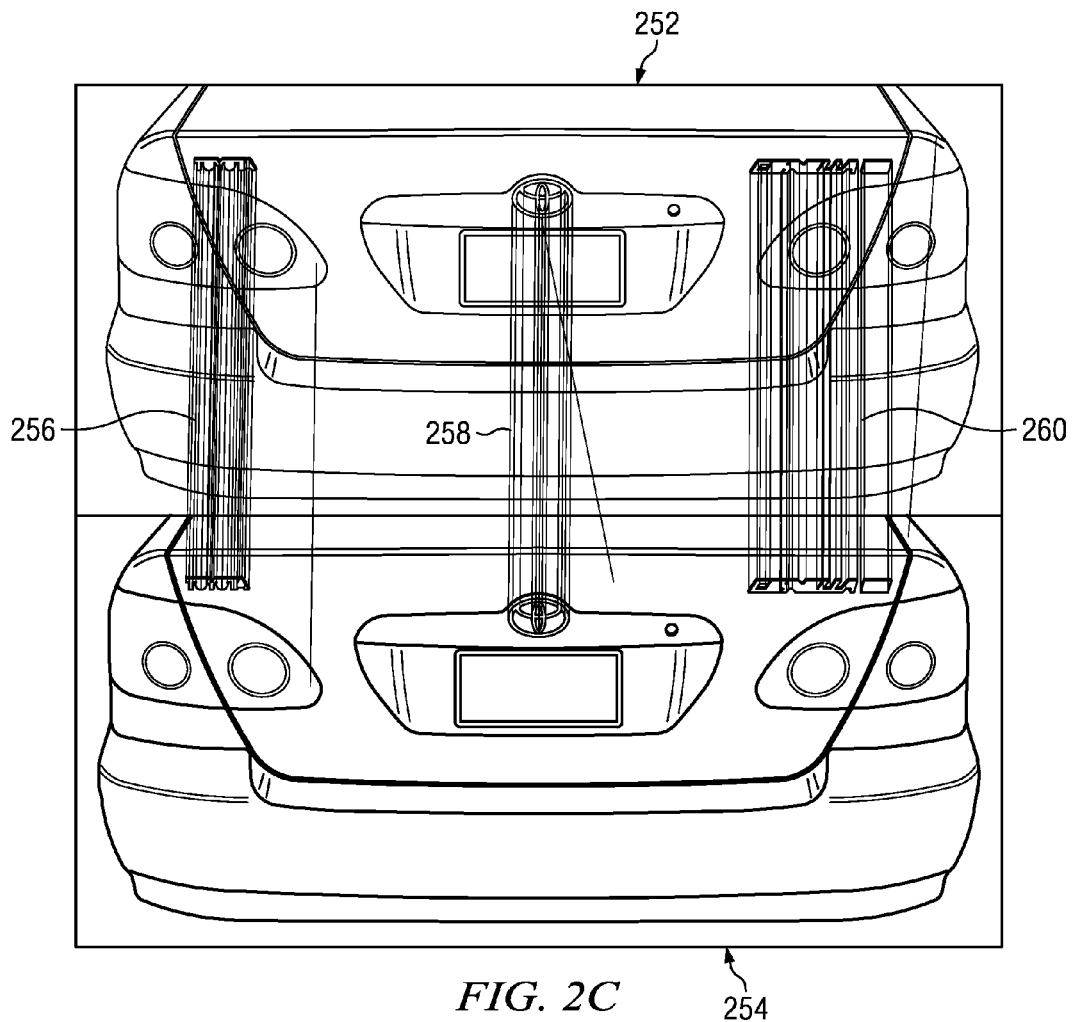
FIG. 2C illustrates exemplary feature vector matching for a captured image and an image in an image library.

For example, shown in FIGS. 2B and 2C are baseline images 252 of an automobile being compared against user photographs 254 of an automobile. The lines 256, 258, 260 between the images represent corresponding interest points and/or matched feature vectors. More particularly, the lines 256 represent matches across the make ("Toyota"), the lines 258 represent matches across the trademark logo, and the lines 260 represent matches across the model ("Corolla"). In some embodiments, other features, such as the tail lights may be matched. Also, in some embodiments, in operation, an input or query image 254 is compared against many sample images of the same make/model to help account for false matches.

Figure 2D:
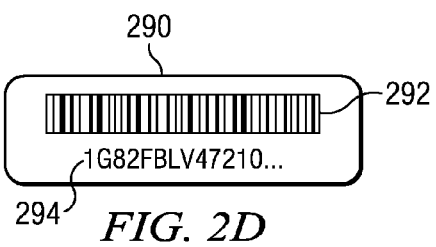
FIG. 2D illustrates an exemplary VIN that can be identified and used to access vehicle information.

FIG. 2D illustrates an exemplary VIN 290, as seen, for example, through the front windshield of a vehicle. As shown, the VIN 290 may include a bar code 292 representing the VIN letters and numerals, as well as the letters and numerals themselves 294. According to some embodiments, the image capture device is used to capture an image of the VIN 290. In some embodiments, an OCR module converts the letters and numerals into a machine-readable form that can then be used to access one or more databases. In other embodiments, the bar code may be read and, again, the recognized VIN can be used to access vehicle information databases.

Figure 3:
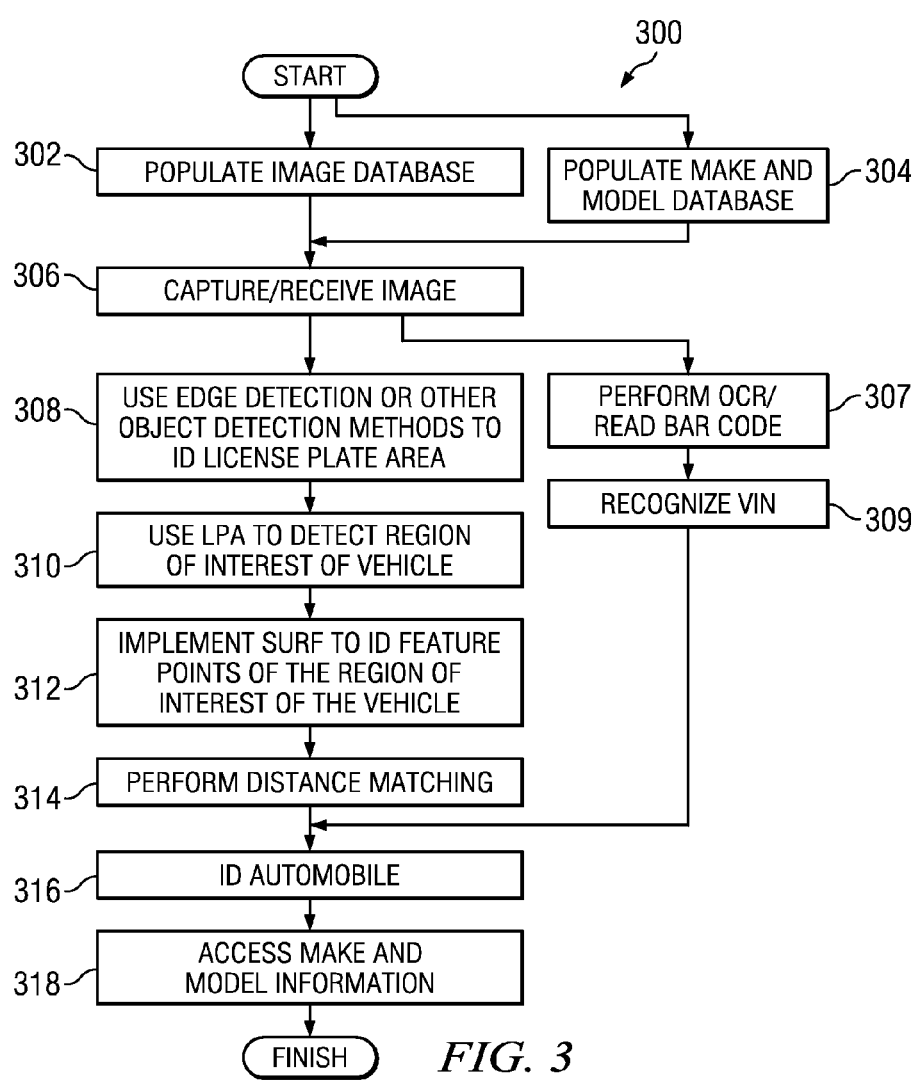
FIG. 3 is a flowchart illustrating operation of exemplary embodiments.

Turning now to FIG. 3, a flowchart 300 illustrating operation of vehicle identification according to embodiments is shown. Initially, as discussed above, an image database is populated or otherwise accessed (step 302). The database may be of "raw" images of vehicles or may be a database storing pre-processed image data (according to an exemplary image recognition method, such as SURF or SIFT), or both. In addition, a make and model database may be populated (step 304). Both these steps may be accomplished off-line and provided by a service provider. Further, as noted above, third-party databases may likewise be populated and made available to the vehicle assistant app 112. In some embodiments, such databases are searchable using a vehicle's VIN.

At a dealer lot or other venue for purchasing a vehicle, the vehicle assistant app 112 may be used to activate the image capture device 110 to capture an image of the vehicle (step 306). In some embodiments, the image is of a predetermined portion of a vehicle (such as its rear end or its front end), although in other embodiments, the angle may be arbitrary.

In some embodiments, the VIN is captured. In such embodiments, an OCR may be performed on the VIN or an associated bar code may be read (step 307). Once the VIN has been decoded, it may be recognized (step 309) and used to identify a corresponding vehicle (step 314).

According to some embodiments, the license plate area is identified using edge detection methods or by using the SURF algorithm (step 308). Once the license plate area has been identified, the region of interest of the rear portion of the vehicle is detected using the license plate area (step 310). Once the region of interest has been identified, SURF may be used to identify feature points of the region of interest (step 312). Depending on the embodiment, these steps can be performed by the vehicle assistant app 112 itself, or after the image has been uploaded to the service provider 106.

Once the feature vectors have been defined, distance matching with the data in the image database 120 may be performed (step 314). Again, this may be performed by the feature recognition module 114 of the service provider, or by the vehicle assistant app 112, or both.

Once the matching has been performed, a vehicle may be identified (step 316) and may be used to access the make and model database 122 to provide make and model information to the user (step 318). As will be discussed in greater detail below, such make and model related information can include, or can be used to determine, insurance and financing related information for the vehicle in question.

Figure 4A:
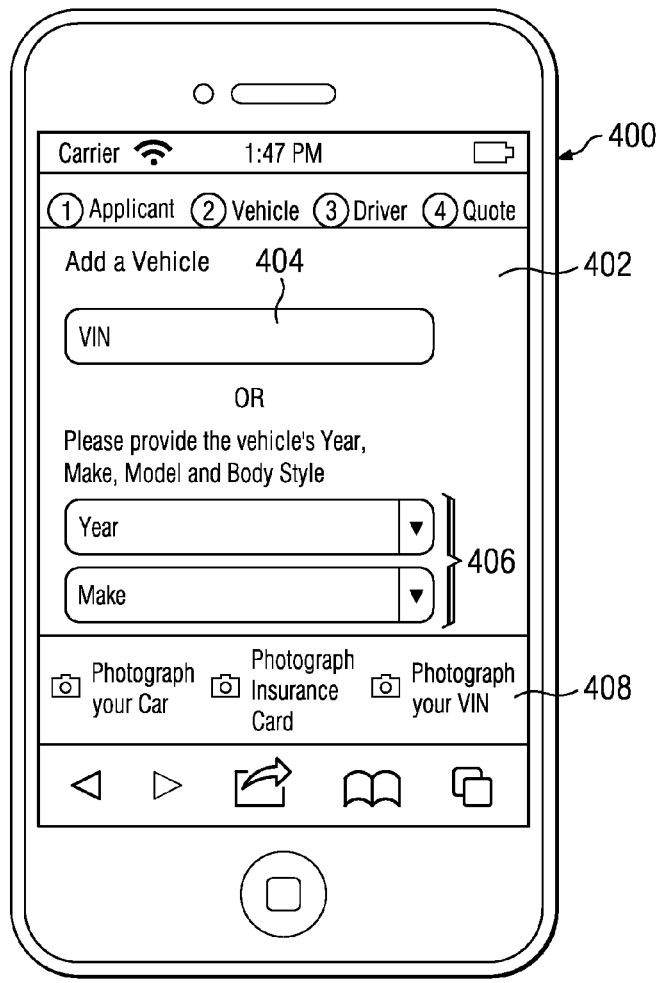
FIG. 4A and FIG. 4B illustrate exemplary user interfaces for a vehicle recognition app.

FIG. 4A illustrates an exemplary user device, such as a cellular telephone, that includes a graphical user interface (GUI) 402 for a vehicle recognition app 112 (FIG. 1) that can be used to input vehicle identification information for obtaining vehicle information, such as purchasing information, financing information, or insurance information. As shown, the GUI 402 allows a user to Add a Vehicle using a manual or semi-manual VIN input 404 or Year, Make, Model, and Style input 406. In addition, or alternatively, as shown using one of the controls 408, a user can obtain an identification of the vehicle by photographing the car, the insurance card, or the VIN. In some embodiments, the user may be able to select an already stored picture of the car, the insurance card, or the VIN.

Figure 4B:
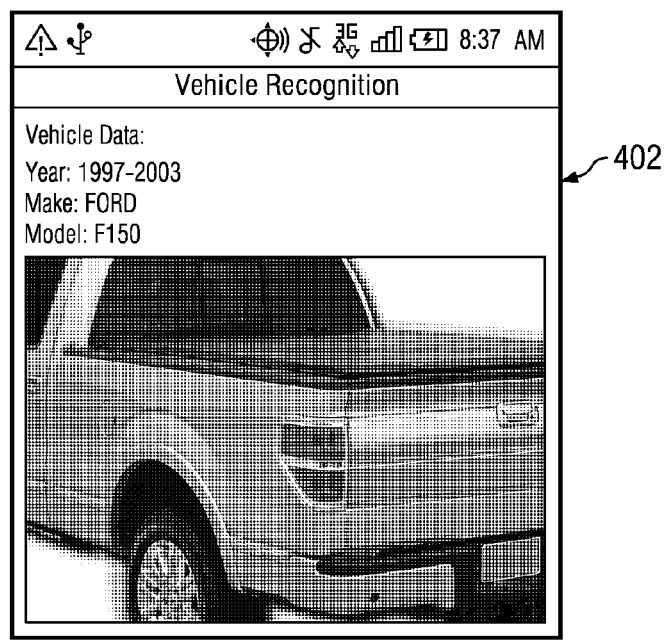

Once a picture is taken or retrieved, the image is analyzed and the make, model and year of the automobile is returned, as shown in FIG. 4B. Once vehicle information of this type is known, information pertaining to the particular vehicle can be provided.

Figure 5:
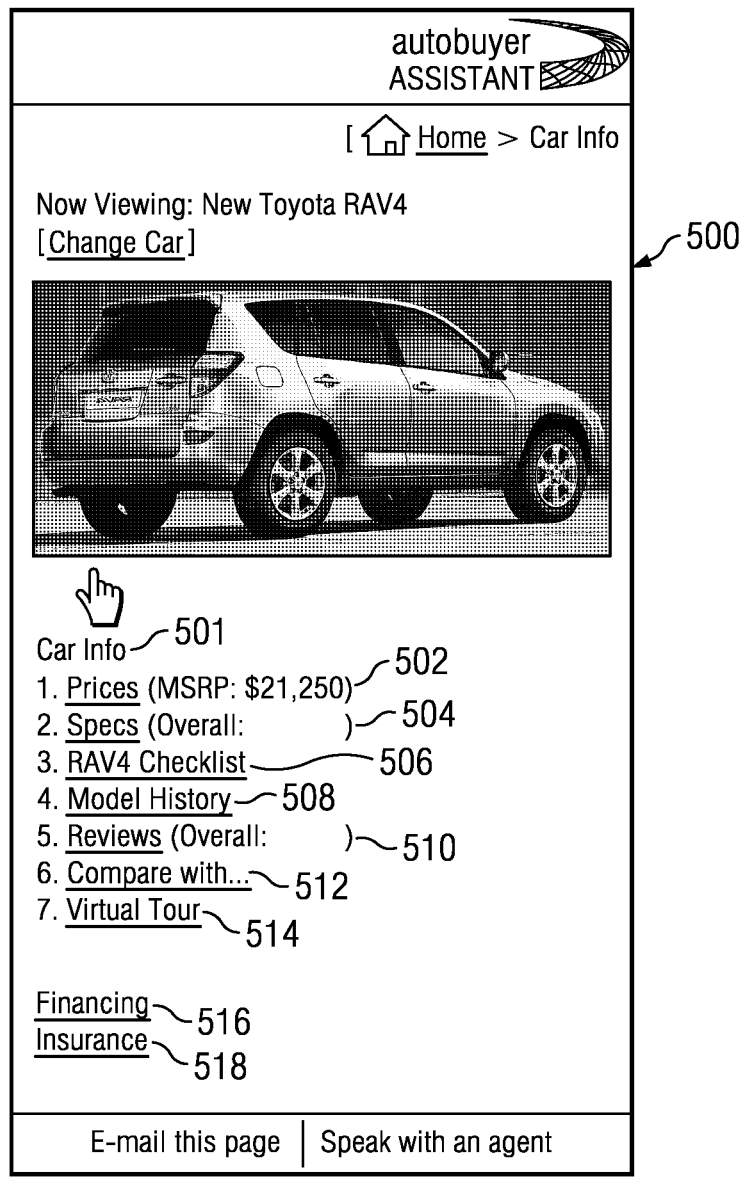
FIG. 5 is diagram of an exemplary graphical user interface for a vehicle assistant app.

As noted above, the vehicle recognition system may be part of a vehicle assistance app 112 that provides additional information about the vehicle once it has been identified. The vehicle assistance app 112 may be a standalone app or may provide a wireless interface to one or more web pages provided by the service provider 107. For example, shown in FIG. 5 is a graphical user interface 500 that can be provided on the screen of the user device once the vehicle has been identified. In the embodiment illustrated, the app 112 can provide a variety of information on the vehicle via, for example, a plurality of hyperlinks. As shown, these can include Prices 502, Specs 504, Checklists 506, Model History 508, Reviews 510, Compare with . . . 512, and Virtual Tour 514. In addition, links to Financing 516 and Insurance 518 tools may be provided.

Figure 6:
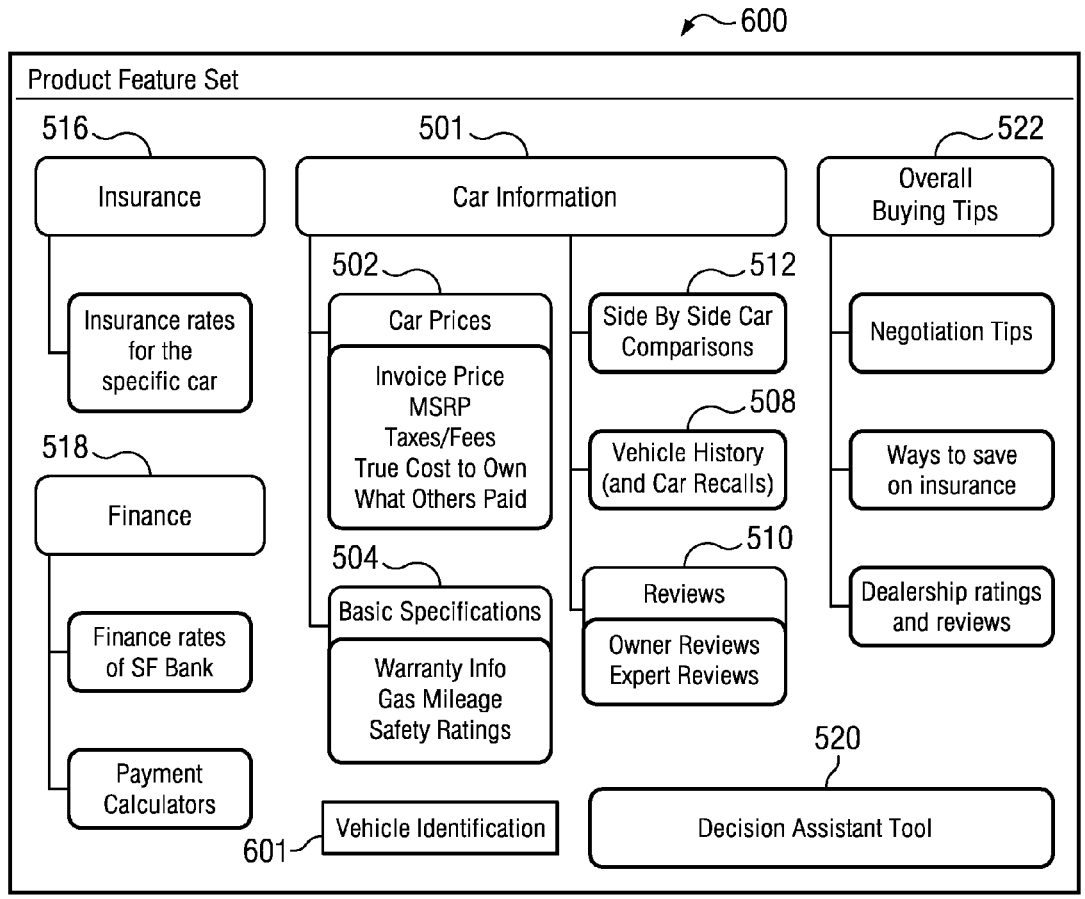
FIG. 6 is a block diagram illustrating exemplary features of a vehicle assistant app.

FIG. 6 illustrates various components provided by such an app in greater detail. It is noted that more or less information may be provided, depending on the embodiment or particular implementation.

Once the vehicle identification 601 has been performed, in a manner similar to that discussed above, vehicle-related information can be provided, for example via a web interface, from a make and model database.

Insurance information 516 can include insurance rates for the specific car. Financing information 518 can include finance rates of one or more banks, as well as payment calculators.

Car information 501 may include car prices 502, basic specifications 504, side by side car comparisons 512, vehicle history 508, and reviews 510. Car prices can include invoice price, MSRP, taxes and fees, the true cost to own, and what others have paid. The basic specifications 504 may include warranty information, gas mileage, and safety ratings. Reviews 510 can include owner reviews and expert reviews.

In addition, overall buying tips 522 may be provided, to assist generally in the buying process. These can include negotiation tips, ways to save on insurance, and dealership ratings and reviews. Finally, a decision assistant tool 520 can be provided, which can allow for assessing a particular deal.

Figure 7A:
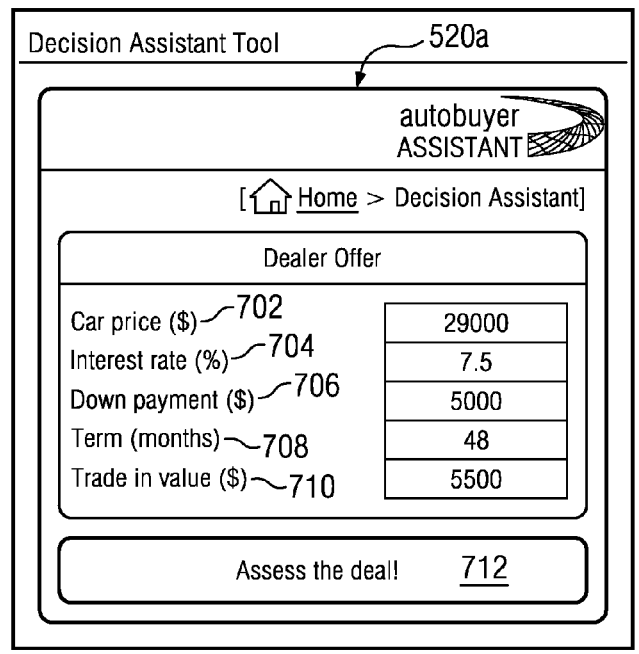
FIG. 7A and FIG. 7B illustrate an exemplary auto buyer assistant app.
Figure 7B:
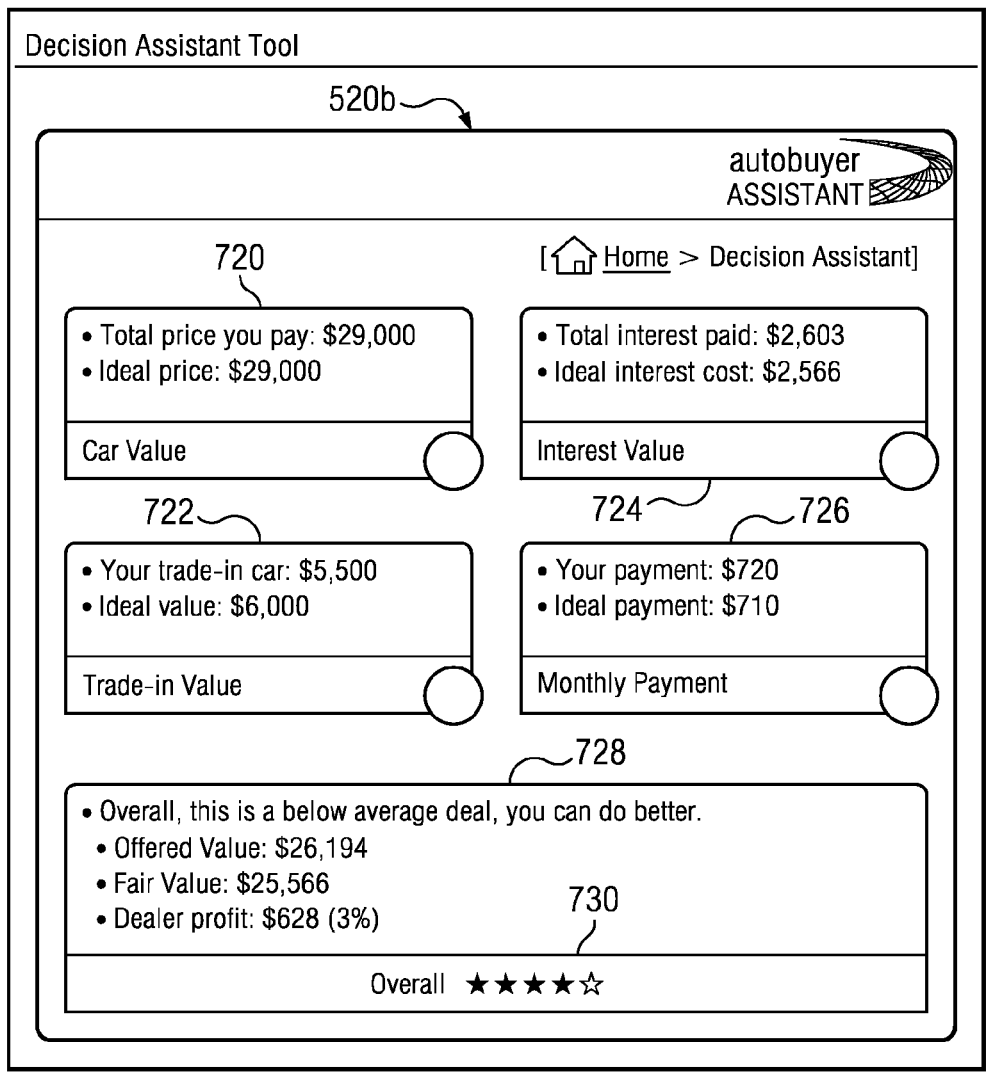

For example, shown in FIG. 7A is a diagram of an exemplary entry page for an auto buyer assistant 520a, associated with the vehicle assistant app 112, that allows the user to evaluate the dealer offer. Variables for consideration include car price 702, interest rate 704, down payment 706, term 708, and trade-in value 710. The user can elect to assess the deal 712 and be shown the results at 520b (FIG. 7B).

The results page 520b can include a variety of information, such as comparisons of car value 720, trade-in value 722, interest value 724, and monthly payment 726. An assessment window 728 can provide a text assessment as well as an overall star rating 730.

It is noted that, in some embodiments, more than one vehicle can be identified and the results compared. That is, in some embodiments, the user can capture images of first one, then another vehicle, have the feature recognition system identify them, and then compare features, specifications, pricing and financing and insurance options. For example, shown in FIG. 8 is a diagram of a screen 800 showing a side-by-side comparison of two vehicles 804, 806. A plurality of default criteria 802 may be displayed or, the user may be given the option to customize the compare criteria. Depending on the particular implementation, the comparison may be provided by the vehicle assistant app 112 on the user device 104 or by the buyer assistant module 116 associated with the service provider 106 and displayed as a web page.

Figure 9:
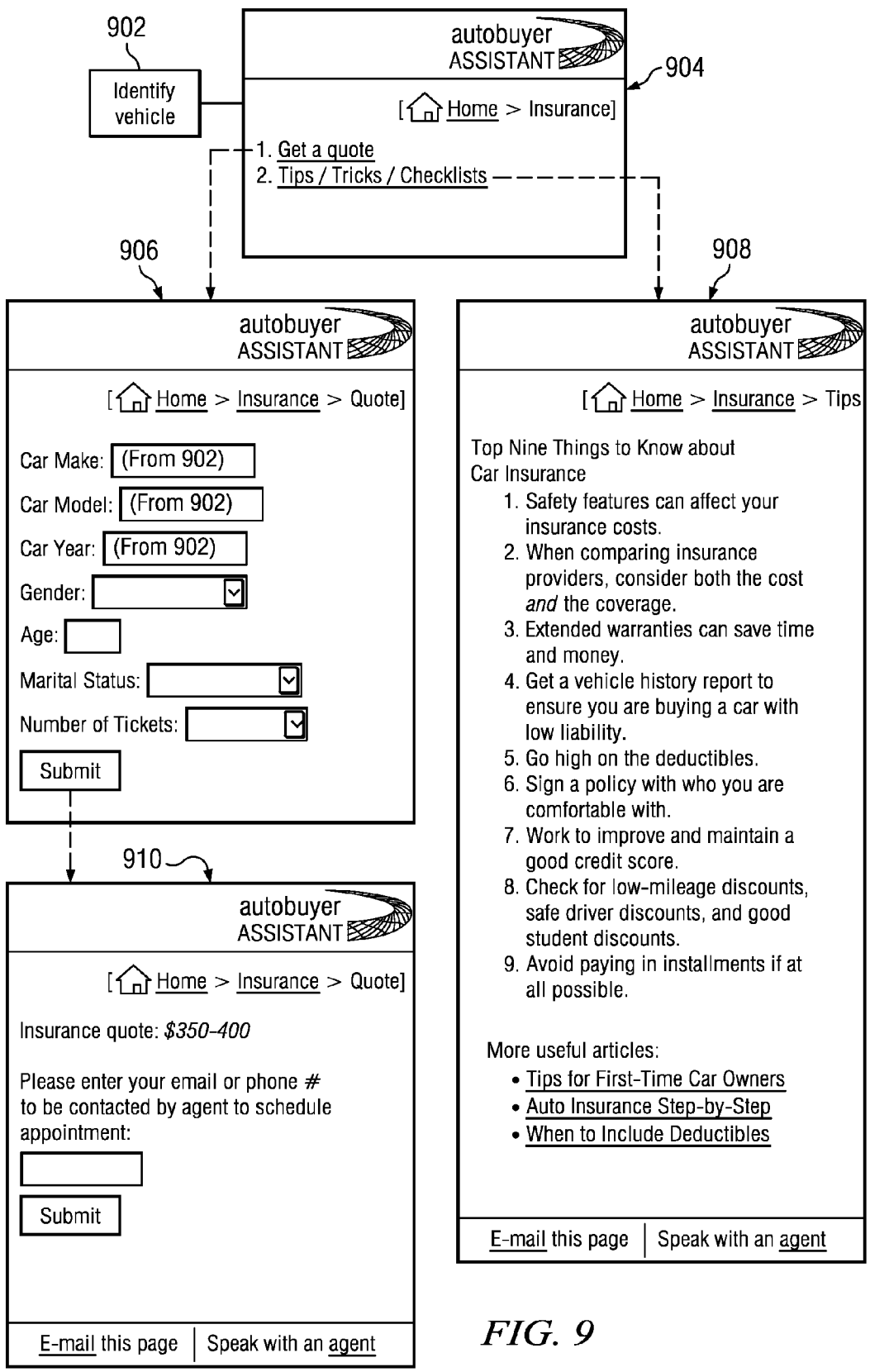
FIG. 9 illustrates exemplary presentation of insurance options using automatic vehicle identification.

As noted above, according to some embodiments, insurance information related to a vehicle can be provided upon its automatic identification as described. FIG. 9 illustrates an exemplary insurance assistant implemented using the vehicle assistant app 112. As shown at 902, in one or more windows or interfaces of the vehicle assistant app 112, a vehicle can be identified. A window 904 then gives the user the option to get an insurance quote to view tips and/or checklists associated with the particular vehicle or vehicles in general. An exemplary tip window, including links to additional pages, is shown at 908.

If the user elects to get a quote, then a window 906 may provide him with a screen for entering information needed for the quote. Make, model and year information is populated by the vehicle identification system, as discussed above. Once the user fills in the remaining information, he can elect to submit the information and then be shown a window 910 with a quote corresponding to the identified automobile and his personal information.

Figure 10A:
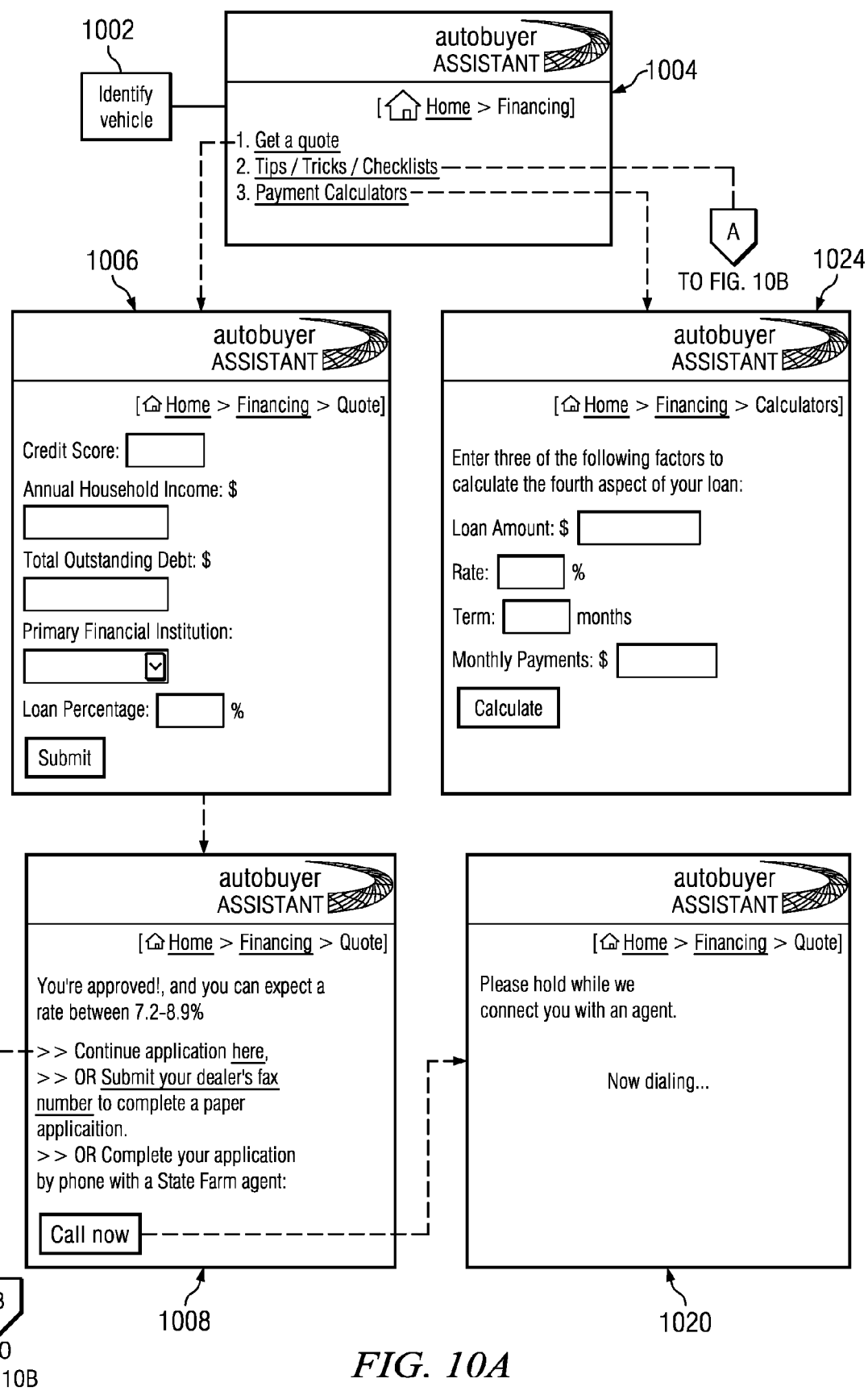
FIGS. 10A and 10B illustrate exemplary presentation of financing options using automatic vehicle identification.
Figure 10B:
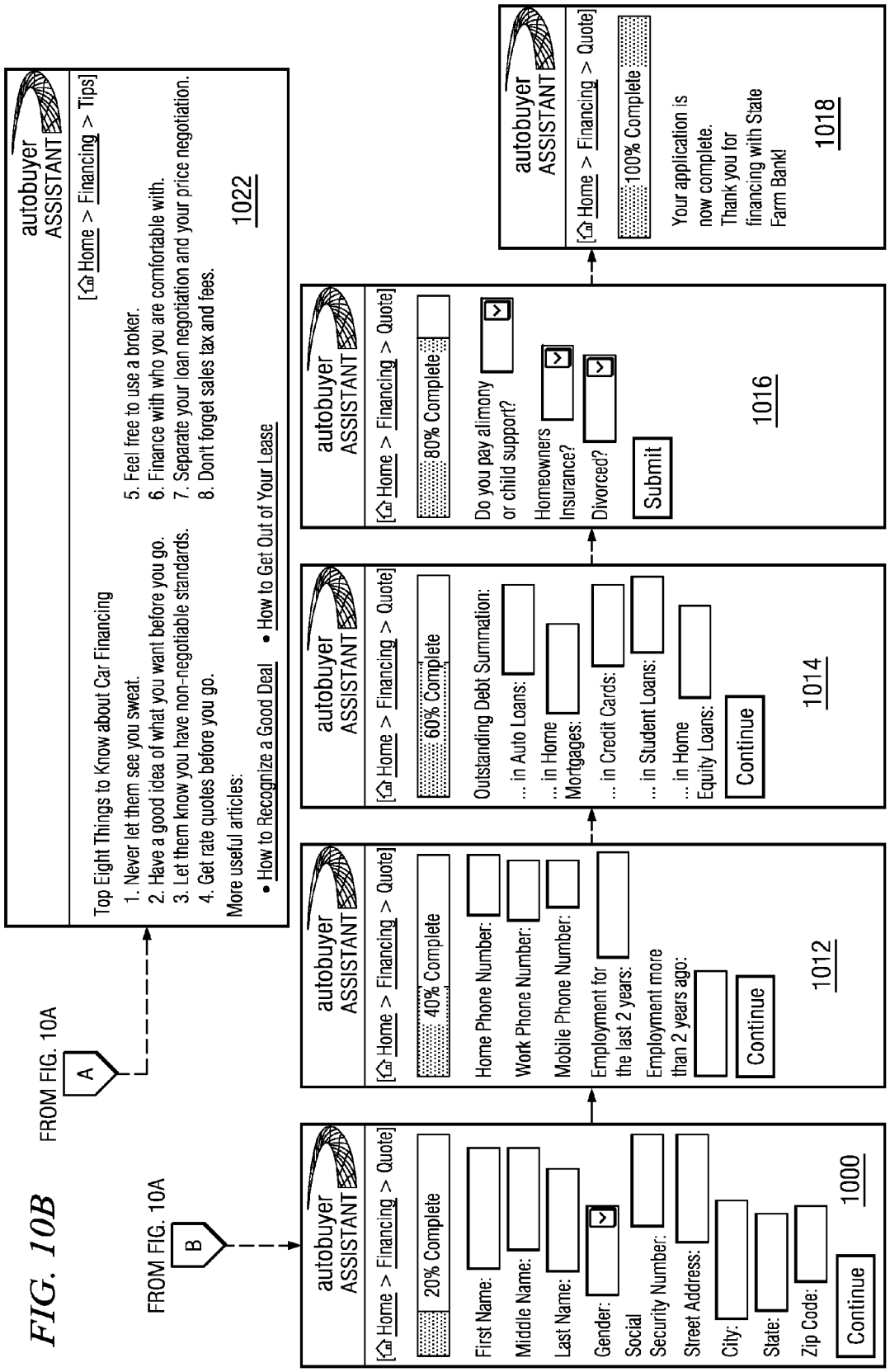

In addition, according to some embodiments, financing information related to a vehicle can be provided upon its automatic identification as described. FIG. 10 illustrates an exemplary financing assistant implemented using the vehicle assistant app 112.

In the example illustrated, once the vehicle has been identified 1002, the vehicle assistant app can display one or more financing options 1004. These include getting a quote 1006, viewing payment calculators 1024, or seeing tips 1022. If the user elects to get a quote, he may enter certain data, such as income and credit score, and receive preliminary approval 1008. From there, he may be connected to an agent 1020, or continue the application for financing on the device, as shown in windows 1010, 1012, 1014, 1016, and 1018.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Embodiments discussed herein can be implemented in one or more computers or processing devices communicatively coupled to a network (for example, the Internet) or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

Benefits, other advantages, and solutions to problems have been described above with regard to specific, exemplary embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for use in a network comprising:
   with at least one computing device:
      receiving data comprising an electronic image of at least a portion of a vehicle from a prospective purchaser,
      automatically analyzing the image to identify a license plate area of the image;
      based on the identified license late area, automatically identifying a region of interest of the image corresponding to a rear portion of the vehicle around the license plate;
      automatically analyzing the region of interest of the image corresponding the rear portion of the vehicle around the license plate using at least one object recognition technique to extract features from the image;
      comparing the features extracted from the image with data associated with an image database of reference vehicle images for a plurality of reference vehicles, including features extracted from a region of interest of each reference vehicle image corresponding to a rear portion of the respective reference vehicle around the license plate;
      identifying a make and model of the vehicle based on the results of the comparison; and delivering vehicle-related information to the prospective purchaser based on the identified make and model of the vehicle.

2. A method in accordance with claim 1, wherein the vehicle-related information comprises vehicle-specific information.

3. A method in accordance with claim 1, wherein the vehicle-related information comprises insurance information.

4. A method in accordance with claim 1, wherein the vehicle-related information comprises financing information.

5. A method in accordance with claim 1, wherein the vehicle-related information comprises comparative information associated with a purchase of the vehicle.

6. A method in accordance with claim 1, wherein the vehicle-related information comprises historical information about the vehicle.

7. A method in accordance with claim 1, wherein the vehicle is identified from the image using a global feature based object recognition approach.

8. A method in accordance with claim 1, wherein the vehicle is identified from the image using a local feature based object recognition approach.

9. A method in accordance with claim 1, wherein identifying from the image the license plate area of the electronic image comprises using edge detection.

10. A system for providing information to a purchaser of a vehicle, comprising:
an image capturing device associated with a prospective vehicle purchaser;
at least one processing device in communication with the image capturing device and configured to:
receive an electronic image of at least a portion of a vehicle from the image capturing device, wherein the image is of an exterior portion of a vehicle other than a portion displaying a Vehicle Identification Number,
automatically identifying a license plate area of the image;
based on the identified license plate area, automatically identify from the image a region of interest of the image corresponding to a rear portion of the vehicle around the license plate of the vehicle; and
identify a make and model of the vehicle using at least one object recognition technique, the at least one object recognition technique including comparing features extracted from the region of interest of the image corresponding to the rear portion of the vehicle with data associated with an image database of vehicle images, wherein features extracted from the image comprise features associated with the region of interest around the license plate of the vehicle other than a Vehicle Identification Number; and
automatically access information from a database corresponding to the make and model of the vehicle identified from the image and deliver the information to the prospective vehicle purchaser.

11. A system in accordance with claim 10, wherein the at least one processing device is configured to identify the vehicle using a scale invariant feature transform based method.

12. A system in accordance with claim 10, wherein the at least one processing device is configured to identify the vehicle using a speeded-up robust features based method.

13. A system in accordance with claim 10, wherein vehicle identification comprises an identification of an individual vehicle, and the information comprises a history of the individual vehicle.

14. A system in accordance with claim 10, wherein a vehicle identification comprises an identification of a make and model of a vehicle, and the information comprises information associated with a vehicle of the same make and model.

15. A system in accordance with claim 10, wherein the information comprises insurance-related information.

16. A system in accordance with claim 10, wherein the information comprises financing-related information.

17. A system in accordance with claim 10, wherein the processing device is configured to identify from the image the license plate area of the electronic image comprises using edge detection.

18. A method for use with non-transitory computer readable media operable on one or more processors, the method comprising:
receiving data comprising an electronic image of at least a portion of a vehicle from a prospective purchaser,
automatically analyzing the image to identify a license plate area of the image;
based on the identified license plate area, automatically identifying a region of interest of the image corresponding to a rear portion of the vehicle around the license plate;
identifying a make and model of the vehicle from features extracted from the region of interest of the image corresponding the rear portion of the vehicle around the license plate using at least one object recognition technique for comparing the extracted features with data from an image database of vehicle images, wherein features extracted from the image comprise features associated with the region of interest around the license plate of the vehicle other than a Vehicle Identification Number; and
providing information to the prospective vehicle purchaser from a database corresponding to identified make and model of the vehicle identified.

19. A method in accordance with claim 18, wherein the identifying comprises identifying the vehicle using a scale invariant feature transform based method.

20. A method in accordance with claim 18, wherein the identifying comprises identifying the vehicle using a speeded-up robust features based method.

21. A method in accordance with claim 18, wherein identifying the vehicle comprises identifying an individual vehicle, and the information comprises a history of the individual vehicle.

22. A method in accordance with claim 18, wherein identifying the vehicle comprises identifying a make and model of a vehicle, and the information comprises information associated with a vehicle of the same make and model.

23. A method in accordance with claim 18, wherein identifying from the image the license plate area of the electronic image comprises using edge detection.

24. A method of vehicle identification and provision of vehicle information, the method comprising:
receiving an electronic image of at least a portion of a vehicle from an image capturing device,
providing a database of reference vehicle images of a plurality of reference vehicles and a vehicle information database;
automatically analyzing the image to identify a license plate area of the image;
based on the identified license plate area, automatically identifying a region of interest of the image corresponding to a rear portion of the vehicle;
using at least one object recognition technique other than character recognition to identify objects/features of the vehicle from the region of interest of the image corresponding to a rear portion of the vehicle; and comparing the identified objects/features of the vehicle with objects/features identified from the reference vehicle images stored in the database;

identifying the vehicle imaged by the image capturing device based on the comparing of objects/features; and providing information from the vehicle information database corresponding to the identified vehicle imaged by the image capturing device.

25. A method in accordance with claim 24, wherein the comparing via an object/feature based method comprises a global feature based object recognition method.

26. A method in accordance with claim 24, wherein the comparing via an object/feature based method comprises a local feature based object recognition method.

27. A method in accordance with claim 24, wherein the comparing via an object/feature based method comprises a scale invariant feature transform based method.

28. A method in accordance with claim 24, wherein the comparing via an object/feature based method comprises a speeded-up robust features based method.

29. A method in accordance with claim 24, wherein identifying from the image the license plate area of the electronic image comprises using edge detection.

* * * * *